Patented Oct. 12, 1943

2,331,862

UNITED STATES PATENT OFFICE 2,331,862

CATALYST FOR ACID-CURING THERMO-SETTING RESINS

Norman A. Shepard, Stamford, Conn., assignor to American Cyanamid Company, New York, N. Y., a corporation of Maine No Drawing. Application September 18, 1941, Serial No. 411,317

5 Claims. (Cl. 260—71)

This invention relates to substantially stable compositions containing acid-curing thermosetting resins, and is especially directed to such compositions which include suitable curing catalysts.

Most of the catalysts which have previously been proposed for use with acid-curing thermosetting resins cause such resins to partially or wholly cure at relatively low temperatures. If compositions containing such catalysts, together with an uncured acid-curing thermosetting resin be stored, the resin may be partially or wholly cured even at normal temperatures. This results in the case of molding powders in a loss of proper flow characteristics and, therefore, in loss of utility for most purposes. Furthermore, if it be desirable to subject the composition containing the resin and catalyst to a preliminary mild heat treatment without curing as may be necessary in many operations, such as textile treating, then it is preferable to use a curing catalyst which is relatively inactive at low temperatures but which will cure the resin readily at somewhat higher temperatures.

One object of this invention is to provide catalysts or accelerators for acid-curing thermosetting resins which will cure such resins rapidly only at relatively high temperatures. Another object of this invention is to provide catalysts which will not cure resinous molding compositions appreciably at room temperatures.

These and other objects are attained by employing as a catalyst a compound having the following formula:

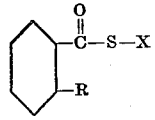

wherein R is selected from the group consisting of hydrogen, —COOH, or

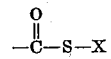

and where X is a carbocyclic radical.

The following examples in which the proportions are by parts by weight are given by way of illustration and not in limitation.

Example 1

To a urea-formaldehyde resin molding composition about 0.1%–0.5% of thio beta naphthyl benzoate is added and the mixture is ground in a ball mill or other suitable apparatus for about twelve hours. The resulting composition may be molded at about 135–165° C., preferably at about 150° C. and cured for about two to three minutes. A pressure of about 3000–5000 pounds per square inch is generally suitable for this molding operation. The resulting molded article is resistant to moisture. The uncured molding powder containing the catalyst is quite stable upon storage at normal temperatures.

Example 2

| | Parts |
|---|---|
| Bleached sulfite wood pulp | 37 |
| Urea-formaldehyde resin (dry basis) | 63 |
| Zinc stearate | 0.5 |

The pulp is impregnated with an aqueous urea-formaldehyde resin syrup and dried in the usual manner preferably below about 100° C. The zinc stearate may be added as a mold lubricate and the mixture ground in a ball mill or other suitable apparatus. About 0.1–1 part of the thio beta naphthyl phthalate is added during the grinding. After the mixture has been ground for a sufficient length of time a molding composition is obtained which is substantially stable during storage. This composition may be molded at about 135°–165° C., preferably at about 150° C. and under pressure of about 3000–5000 pounds per square inch for a period of several minutes. The resulting molded article is thoroughly cured and has good water resistance.

Other acid-curing thermosetting resins may be substituted for all or part of the urea-formaldehyde resin employed in Examples 1 and 2. The term "acid-curing thermosetting resin" includes those resins which may be cured only under acid conditions and also those which may be cured under either acid or alkaline conditions. Such resins include those obtained by reacting an aldehyde e. g., formaldehyde (or polymers thereof), acetaldehyde, benzaldehyde, etc. with one or more of the following: thiourea, the reaction products obtained by heating and decomposing dicyandiamide, melamine, other aminotriazines, phenol, other phenols such as the alkyl phenols, etc. Mixed resins, e. g., urea-melamine-formaldehyde, urea-thiourea-formaldehyde resins, etc. may be prepared by reacting the aldehyde with each of the other reactants separately or the aldehyde may be reacted with a mixture of the other reactants. Mixed resins containing from about 20%–60% of melamine-formaldehyde resin and the remainder urea-formaldehyde resin are especially suitable.

Usually only a small portion of catalyst is necessary to produce rapid cures, e. g., about 0.1%–1%. In some cases it may be desirable to use up to about 2%–3% of catalyst, and even considerably greater quantities of catalyst may be used without causing substantial pre-curing during storage or the like.

Catalysts which are derived from aromatic acids such as phthalic acid and benzoic acid are especially suitable for the purposes of my invention. If phthalic acid derivatives be employed, the compound may be either a mono- or di- derivative thereof. Obviously various mixtures of the catalyst described herein may be used.

Various fillers e. g., wood flour, cotton linters, clay, etc. may be used in place or in addition to cellulose pulp included in the compositions of Examples 1 and 2. Furthermore, coloring materials may be included if desired. In some applications it may be desirable to add modifying agents such as starches, gums, alignates, casein, etc. Plasticizing agents, e. g., toluene-sulfonamides, alkyd resins, polyhydric alcohols, etc. may be incorporated in the compositions.

The catalysts which I have described may be employed in molding powders or in solid compositions which have been prepared for hot pressing into sheets, rods, bars, or other units, as well as in compatible resin syrups for use in impregnating, laminating, adhesives, etc. They may also be used in compatible coating compositions containing acid-curing thermosetting resins.

This is a continuation-in-part of my co-pending patent application Serial Number 282,815 filed on July 4, 1939, now Patent No. 2,263,447.

Obviously many modifications and variations in the processes and compositions described above may be made without departing from the spirit and scope of the invention as defined in the appended claims.

I claim:

1. A composition which is substantially stable at normal temperatures comprising an acid-curing thermosetting resin and a latent catalyst of the formula:

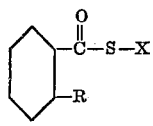

wherein R is selected from the group consisting of hydrogen, —COOH and

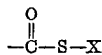

and where X is a naphthyl radical.

2. A composition which is substantially stable at normal temperatures comprising an acid-curing thermosetting resin and as a latent curing catalyst thio beta naphthyl benzoate.

3. A composition which is substantially stable at normal temperatures comprising an acid-curing thermosetting resin and as a latent curing catalyst thio beta naphthyl phthalate.

4. A process which comprises adding to an acid-curing thermosetting resin a latent curing catalyst including a compound of the following formula:

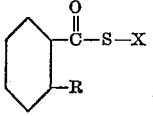

wherein R is selected from the group consisting of hydrogen, —COOH and

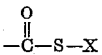

and where X is a naphthyl radical, and subjecting the mixture to a polymerizing temperature, above about 135° C.

5. A composition as in claim 1 wherein the resin is a urea-formaldehyde resin.

NORMAN A. SHEPARD.